Aug. 27, 1929.  H. WILLIAMS  1,726,132
TRANSMISSION MECHANISM
Filed Sept. 27, 1924  2 Sheets-Sheet 1
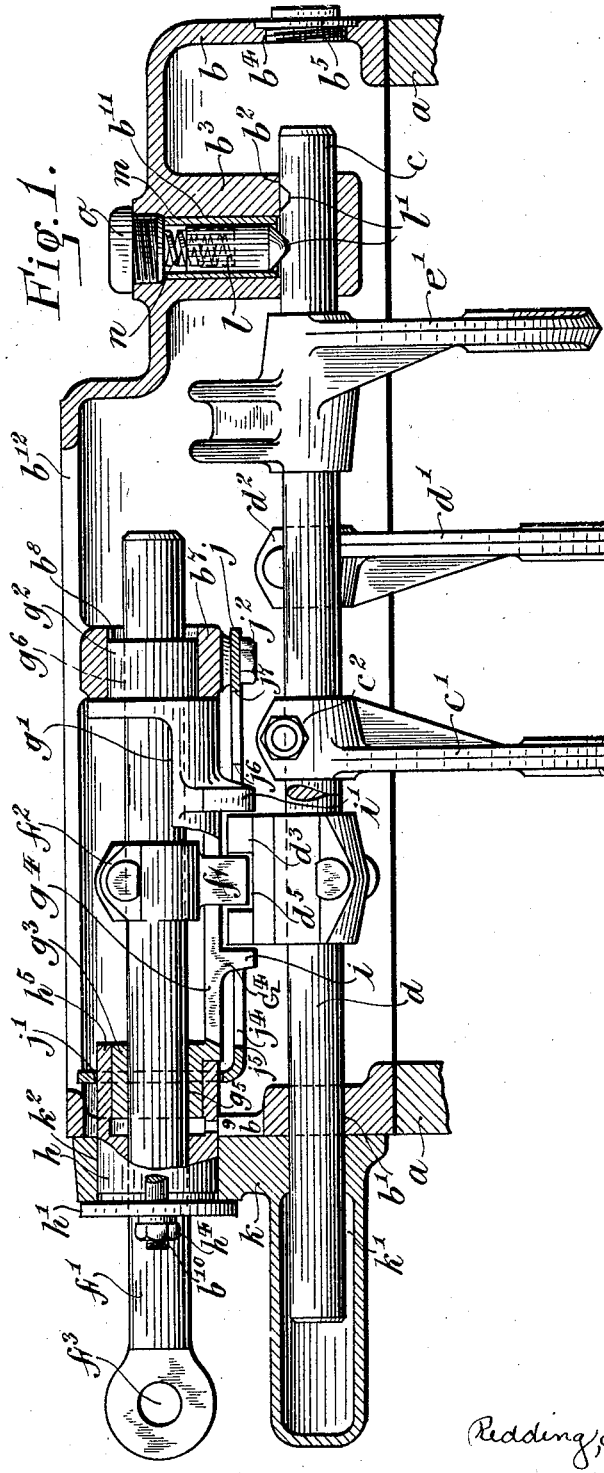
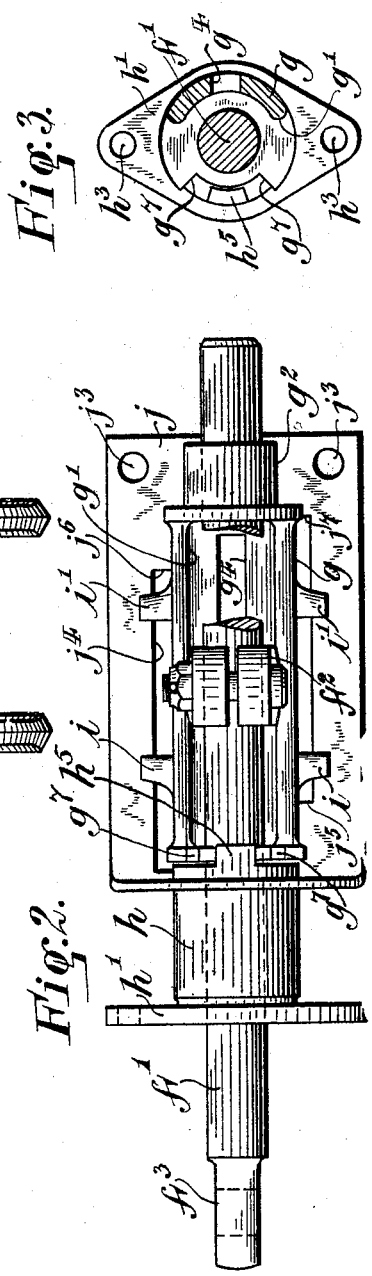
INVENTOR
*Harry Williams*
BY
Redding, Greeley, O'Shea and Campbell
ATTORNEYS

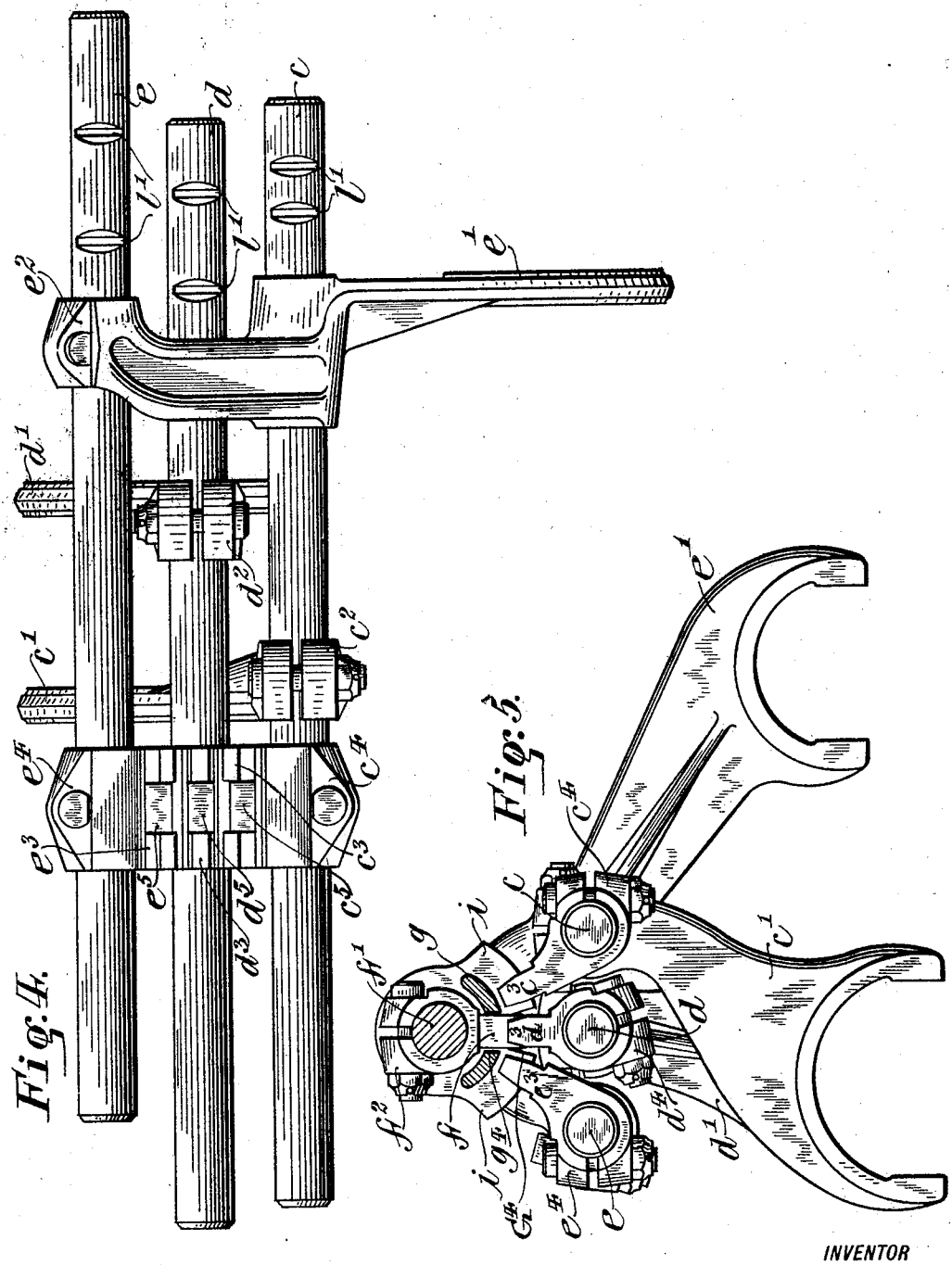

Patented Aug. 27, 1929.

1,726,132

UNITED STATES PATENT OFFICE.

HARRY WILLIAMS, OF ELIZABETH, NEW JERSEY, ASSIGNOR TO INTERNATIONAL MOTOR COMPANY, OF NEW YORK, N. Y., A CORPORATION OF DELAWARE.

TRANSMISSION MECHANISM.

Application filed September 27, 1924. Serial No. 740,224.

This invention relates to control mechanism for gear shifts adapted especially for use with remote actuating mechanism. Such control devices have heretofore been provided with several selector rods extending forwardly from the transmission and actuated selectively by connection with the gear shift lever. Such constructions have been open to the objection that difficulties in shifting have been experienced when the chassis frame is distorted in passing over uneven roads. The present invention seeks to obviate these difficulties and simplify the construction of the control mechanism from considerations of manufacture and ease of operation. To this end a single selector rod is provided having both a sliding and rocking movement and extending from operable position with respect to the selector mechanism within the gear box to the gear shift lever. For ease of assembly and disassembly, both during manufacture and when repairs or replacement are necessary it is desirable that the control mechanism be readily removable as a unit not only to facilitate access to the control element but also to permit ready and convenient access to the shifter gears with which the control mechanism is associated. To this end the invention contemplates the housing of the control mechanism in the cover of the transmission housing. Gear shifting mechanism must also serve to lock the shifter forks against simultaneous movement to prevent accidental engagement of more than one set of gears at a time. The invention also resides in the construction and assembly of the various cooperating parts which accomplish this locking action as well as all of the other objects discussed above. Reference is to be had to the accompanying drawings for a detailed description of one embodiment in which:

Figure 1 is a view in side elevation and partly in section showing the shifter shafts and the single selector rod and the means whereby the dogs on the respective shifter shafts may be selectively engaged by the selector finger on the selector rod.

Figure 2 is a view looking from above and showing the selector rod and shifter lock and their associated parts, parts being removed in the interest of clearness.

Figure 3 is a fragmentary view in end elevation of the shifter lock and the stops for limiting the rocking movement of the lock and the selector rod.

Figure 4 is a view looking from above and showing the shifter shafts and the dogs and shifter forks carried thereby.

Figure 5 is a view in end elevation looking from the left of the shifter mechanism and showing the selector rod, shifter lock and shifter dogs and forks, the housings and bearings being removed in the interest of clearness and also showing the manner in which the shifter lock maintains certain of the dogs in position while permitting the actuation of the selected dog by means of the finger on the selector rod.

The invention is applicable with any combination of change speed gearing but has been illustrated and will be referred to as applicable with a transmission involving four speeds forward and reverse. A fragmentary portion of the transmission housing containing the change speed gears, not shown, is indicated at $a$, the opening in the top of which is closed by a closure $b$, adapted to contain the shifting mechanism according to the present invention. By so housing the shifting mechanism in the closure for the casing it may be readily removed as a unit to facilitate access to the change speed gears. Within the housing are disposed a set of three shifter shafts $c$, $d$ and $e$. These shifter shafts are slidable through appropriate apertures $b'$ in the forward end of the housing and in apertures $b^2$ in a web $b^3$ adjacent the rear end. Each shifter shaft carries a shifter fork $c'$, $d'$, $e'$, respectively, at an appropriate place for controlling the movement of the respective gears, in a manner well understood, the shifter forks being adjustable with respect to the respective shafts as at $c^2$, $d^2$ and $e^2$, respectively. Each of the shafts $c$, $d$ and $e$ carry dogs $c^3$, $d^3$, and $e^3$ respectively, aligned transversely when the gears are in neutral position. These dogs are also adjustable and movable with respect to the shafts by the clamping connections $c^4$, $d^4$ and $e^4$. Removal of the shafts from the closure $b$ is effected by releasing the respective clamps of the dogs and forks and withdrawing the shafts through the apertures $b^4$ in the rear end of the closure $b$ which are normally closed by threaded plugs $b^5$. Each of the dogs are relatively narrow transversely at their outer ends as illustrated clearly in Figure 5, but in a longitudinal direction they are of sufficient width to permit the formation of a transversely extending groove or cutout portion $c^5$, $d^5$ and $e^5$ adapted to receive the selector finger $f$ carried upon the selector rod $f'$ in a manner to be hereinafter more fully described.

In the upper portion of the closure $b$ and substantially midway between the front and rear ends thereof is formed a web $b^7$ having a circular aperture $b^8$. Opposite the aperture $b^8$ the front wall of the closure is formed with an opening $b^9$. Passing through the opening $b^9$ and journaled at its rear end in the aperture $b^8$ is a shifter lock $g$ substantially cylindrical in shape with its upper portion cut away as at $g'$ for the reception of the clamp $f^2$ of the shifter finger $f$. The rear end of the shifter lock is reduced in diameter as at $g^2$ to enter the aperture $b^8$ while the forward end is similarly slightly reduced as at $g^3$ and is journaled in a cylindrical bearing member $h$. The lowermost portion of the shifter lock is formed with a longitudinally extending slot $g^4$ through which the shifter finger $f$ extends. Upon opposite sides of this slot and upon the outer surface of the shifter lock are formed skirts extending for an appreciable distance in a lateral direction and extending downwardly far enough to engage the front and rear edges of the dogs, the front skirt $i$ being disposed upon the shifter lock just forwardly of the dogs when in neutral position and the rear skirt $i'$ being disposed just in rear of the dogs when in neutral position. Below the shifter lock is disposed a stop member $j$ having a horizontal portion extending below the shifter lock and a vertical portion at its forward end provided with a circular aperture $j'$ for the reception of the bearing member $h$. The stop member is thus supported at its forward end upon bearing member $h$ and its rear end is supported from the web $b^7$ by screws $j^2$ passing through apertures $j^3$ in the plate. The horizontally extending plate portion $j$ is provided with an opening $j^4$ of irregular outline into which the ends of the dogs extend and which serve as stops or abutments to limit the longitudinal movements of the dogs and hence of the shifter shafts and forks whereby the gears are prevented from being moved beyond their proper positions.

Secured to the forward end of the closure $b$ is a casting $k$ formed with appropriate passage ways $k'$ for the reception of the shifter shafts $c$, $d$ and $e$ when moving forwardly and a circular aperture $k^2$ for the reception of the cylindrical bearing member $h$. This bearing member $h$ is formed at its forward end with a flange or plate portion $h'$. While flange $h'$ may take any desired form it is illustrated as elliptical in shape and formed with a pair of diametrically disposed holes $h^3$. Through these holes $h^3$ may pass bolts $b^{10}$ seated in the closure $b$ and passing through appropriate apertures in the casing $k$ and through the holes $h^3$ to receive nuts $h^4$ whereby the casing and bearing member are secured rigidly to the closure $b$.

The forward and rear ends of the shifter lock are bored as at $g^5$, $g^6$, respectively, for the reception of the shifter rod $f'$ which has clamped or keyed thereto the shifter finger $f$. Rod $f'$ is formed at its forward end with an eye $f^3$ for connection in appropriate manner to the gear shifting lever. Preferably the lever extends from the selector mechanism just described to the control box at the base of the gear shifting lever. The control box, may if desired, house a small crank shaft by which the motion of the gear shift lever is transmitted to the shifter rod.

The operation of the device will be understood from the foregoing description. The selector rod has both a longitudinal sliding movement and a rocking movement about its axis. When in neutral position the three dogs on the respective shifter shafts are aligned transversely, the finger $f$ projecting into the groove formed by the aligned slots $c^5$, $d^5$, $e^5$. Assuming for example that it is desired to bring into mesh the gears shifted by shifter fork $d'$ the selector rod is first rocked by appropriate movement of the gear shift lever until the shifter finger $f$ moves transversely to a position within the slot $d^5$. Since the shifter finger extends through slot $g^4$ the shifter lock is rotated simultaneously with the finger and the skirts $i$, $i'$ are moved to positions upon opposite sides of the dogs $c^3$, $e^3$, respectively, locking these dogs and the shifter shafts to which they are secured against longitudinal movement. Movement of the dog $d^3$ and shifter shaft to which it is connected is permitted, however, by the slot $G^4$ in the skirts $i$, $i'$, respectively which slot is a continuation of the slot $g^4$ and is in register at this time with the dog $d^3$. The selector rod is then moved in the appropriate longitudinal direction by means of the shifter lever and corresponding movement is impressed upon the selector shaft $d$ since the finger $f'$ is in mesh with the dog $d^3$ carried by that shaft to bring the desired gears in mesh. To prevent the gears from slipping out of mesh accidentally, it is proposed to lock the shifter shaft in its set position. This is accomplished by the provision of spring actuated plungers $l$ engaging in grooves $l'$ in the shifter shafts, the grooves being located in the shafts in appropriate positions to be engaged by the plungers in gear set positions. Preferably the plungers $l$ are disposed within recesses $b^{11}$ formed in the web $b^3$, bushings $m$ being provided, if desired, and the tension of the springs $n$, which press the plungers downwardly into contact with the shafts at all times, being controlled by screw plugs $o$.

To prevent the gears being shifted past the proper gear set positions by throwing the transmission into mesh hard enough to slide the notches $l'$ beyond the plungers $l$, the horizontally extending stop member $j$ is provided. The dogs extend within the cut-out portion $j^4$ of the stop member and the forward and rear sides of the cut-out portion are so disposed as to provide stops to limit the longitudinal movement of the dogs as indicated at $j^5$, $j^6$, $j^7$, respectively. The shifter shaft dogs ordinarily come into contact with the appropriate stop when the V-slot $l'$ is very slightly past the center of the plunger $l$ and consequently the gears cannot go beyond their proper positions.

Means are also provided in the construction to prevent turning of the selector finger through an angle greater than that necessary to engage the dogs disposed in the extreme outer positions. In the preferred construction such means take the form of opposed stops $g^7$ on the shifter lock (which turns with the selector finger) and an abutment $h^5$ carried with the bearing member $h$ engaged by one of the stops $g^7$ when the selector shaft is rocked through an angle sufficient to bring the finger $f$ into mesh with the respective outside dog.

A reversal of the movements hereinbefore described occurs when the gears are taken out of mesh and returned to neutral position by appropriate operation of the shifter lever.

To facilitate access to the shifting mechanism the upper portion of the closure $b$ may be formed with an opening $b^{12}$ which may be suitably closed by any convenient form of closure.

Various modifications may be made in the form and disposition of the various constituent elements of the device as well as in the number of speed changes involved and no limitation is intended except as indicated in the appended claims.

I claim as my invention:

1. In a gear shifting mechanism, in combination with a casing and shifter shafts, means in the casing to lock certain of the shafts against movement, a single selector rod mounted in the locking means, means carried with the rod to engage one of the shafts, and a unitary plate within the casing to limit both rocking and sliding movements of the engaging means to the extent required for the shift.

2. In combination with a gear casing having change speed gears therein and an actuating lever, of a closure for said casing, depending members forming bearings for shafts in different planes, a plurality of shifter shafts carrying dogs and shifter forks, and slidably supported in one of said depending members and a side wall of the closure, a bearing member supported in the side wall above the shifter shafts, a cylindrical shifter lock rotatably supported in the bearing member and the other of the depending members and formed with a slot and dog-engaging abutment upon either side thereof, means upon the lock cooperating with a lug upon the bearing member for limiting the rotation of the lock in either direction, a selector finger carried on the selector rod and passing through the slot to selectively engage the dogs and means mounted on the upper depending member and the bearing member for limiting the sliding movement of the selector rod.

This specification signed this 22nd day of September, A. D. 1924.

HARRY WILLIAMS.